United States Patent [19]

de Muinck

[11] 4,290,749

[45] Sep. 22, 1981

[54] PERLITE EXPANSION PROCESS AND APPARATUS THEREFOR

[75] Inventor: Andre R. de Muinck, Littleton, Colo.

[73] Assignee: Johns-Manville Corporation, Denver, Colo.

[21] Appl. No.: 953,376

[22] Filed: Oct. 23, 1978

[51] Int. Cl.³ .............................................. F27B 14/00
[52] U.S. Cl. .................................... 432/13; 431/215; 252/378 P; 432/58
[58] Field of Search ....................... 44/50; 252/378 P; 432/13, 58; 431/215; 106/DIG. 2

[56] References Cited

U.S. PATENT DOCUMENTS

| | | | |
|---|---|---|---|
| 1,516,642 | 11/1924 | Owen | 431/215 |
| 2,639,132 | 5/1953 | Bradford | 252/378 P |
| 2,941,585 | 6/1960 | Loebel et al. | 431/281 |
| 2,992,676 | 7/1961 | Henwood | 431/215 |
| 3,885,904 | 5/1975 | Feng | 431/215 |
| 3,994,665 | 11/1976 | Young | 431/215 |
| 4,035,137 | 7/1977 | Arand | 431/285 |
| 4,060,371 | 11/1977 | Gentry et al. | 431/215 |

FOREIGN PATENT DOCUMENTS

| | | |
|---|---|---|
| 654514 | 6/1951 | United Kingdom . |
| 739617 | 11/1955 | United Kingdom . |
| 791993 | 3/1958 | United Kingdom . |
| 913372 | 12/1962 | United Kingdom . |
| 954615 | 4/1964 | United Kingdom . |
| 1165760 | 10/1969 | United Kingdom . |

*Primary Examiner*—Patrick Garvin
*Assistant Examiner*—J. V. Howard
*Attorney, Agent, or Firm*—Robert M. Krone; Joseph J. Kelly

[57] ABSTRACT

A process and apparatus therefor are described for the expansion of perlite utilizing vaporized heavy liquid fuel as at least half, and preferably all, of the combustion fuel. In this process preheated air is used to vaporize the liquid fuel, which has previously been atomized.

14 Claims, 1 Drawing Figure

U.S. Patent   Sep. 22, 1981   4,290,749
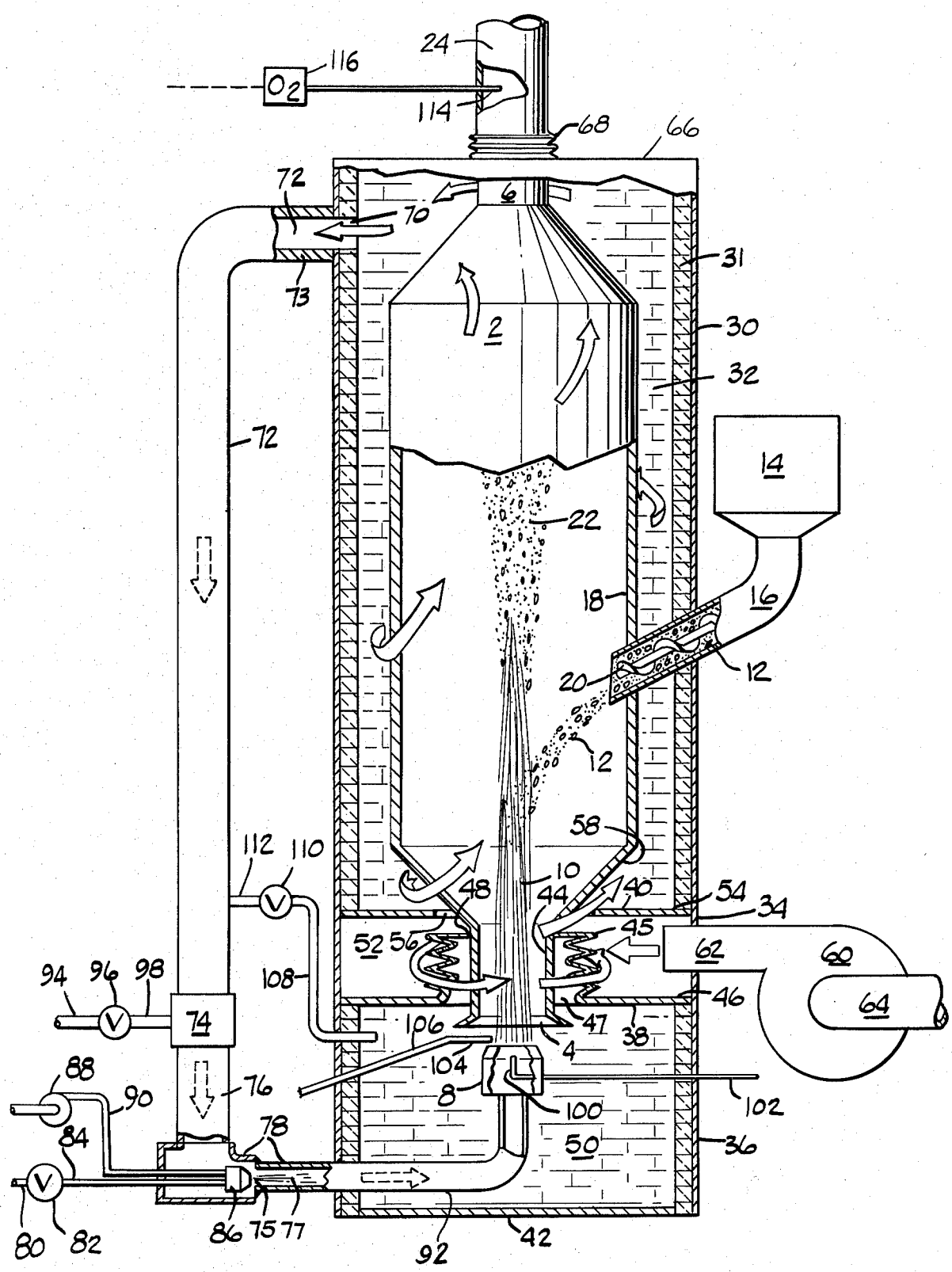

PERLITE EXPANSION PROCESS AND APPARATUS THEREFOR

TECHNICAL FIELD

The invention herein relates to systems for the production of expanded perlite from raw perlite ore.

BACKGROUND OF PRIOR ART

Perlite is a mineral of volcanic origin which generally falls into the rhyolitic class. The unique feature of perlite is that it contains several percent of water of hydration, which, when the perlite is rapidly heated to a temperature on the order of 1600° F. (870° C.), is converted to steam so that the perlite "pops;" i.e., it rapidly expands to a much lower bulk density. The amount of the expansion is usually on the order of 4–20 times the original volume and the final bulk density of the expanded perlite granules will normally be in the range of about 3.5 to 5.0 lbs/ft$^3$ (0.06 to 0.08 g/cm$^3$) for use as insulating fillers or about 7 to 15 lbs/ft$^3$ (0.11 to 0.24 g/cm$^3$) for plaster aggregate use.

Expanded perlite is commonly formed in an expansion chamber. In conventional practice this chamber comprises a vertical vessel, usually cylindrical, having ports at both ends. (It will be recognized that there are expanders of other than cylindrical configurations and orientations other than vertical. However, since commercial expanders are most commonly vertical, the present invention and the prior art processes will all be described herein in terms of vertical expanders for brevity. The present invention is, however, applicable to all types of expanders and those skilled in the art will be readily able to apply the descriptions herein to expanders other than the vertical type.) At the bottom end of the vertical expander is a burner which creates a high temperature flame and flame zone within the chamber. The burner operates by being fed fuel gas such as propane or natural gas which is mixed with the appropriate amount of air for proper combustion. Much additional air also enters through the bottom port of the expansion chamber, since the bottom port is open to the atmosphere. The raw perlite ore is injected into the vertical expansion chamber at a point intermediate the top and the bottom. The raw ore falls by gravity into the flame zone where it is rapidly heated and popped. The volume expansion and density reduction upon popping is such that the expanded perlite granules are thereafter buoyant enough to be entrained in the stream of combustion gases and excess air. This stream containing the entrained expanded perlite granules is drawn out of the top port of the expansion chamber by conventional means such as large blowers mounted in the exhaust line leading from the top of the expansion chamber. The expanded perlite granules are thereafter separated from the exhaust gas flow by conventional separation means such as cyclones.

In the past, the bottom of the expansion chamber has been open to the atmosphere and large quantities of excess ambient air were therefore drawn into the expansion chamber. This resulted in major inefficiencies in the expansion process and considerable waste of fuel, since the combustion and perlite expansion was conducted in the presence of varying and often greatly excessive amounts of air at ambient temperatures. Recently a process with much improved thermal efficiencies and perlite expansion yields has been developed and is described in copending U.S. patent application Ser. No. 754,385 filed on Dec. 27, 1976, by K. L. Jenkins and assigned to the Johns-Manville Corporation, which application is incorporated herein in its entirety. Briefly, the Jenkins process involves isolating the inlet port of the expansion chamber from the ambient surroundings, preheating the inlet air by contact with the exterior surface of the expansion chamber and then passing only the preheated air in controlled quantities to the inlet port for mixing with the gaseous fuel, thus optimizing the efficiency of the fuel combustion and the perlite expansion. There are also other facets of the Jenkins process which are described in detail in the aforesaid U.S. patent application and which contribute to its marked superiority over other prior art perlite expansion process.

In the past, all perlite expansion processes, including the aforementioned Jenkins process, have found that reasonable operating efficiency could be obtained only with the use of light fuel. By "light fuel" is meant those fuels such as propane, natural gas and the like which are gaseous under ambient conditions as well as light liquid fuels including liquified petroleum gas (LPG). Attempts to use heavier liquid fuels such as distillate fuel oil and the like, even in atomized form, did not prove successful. In part, this can be attributed to the variable conditions of operating efficiency of the prior art systems, due to the uncontrolled amounts of ambient air present, as discussed more fully in the aforementioned patent application on the Jenkins process.

During the recent severe winters there have been many instances of shortages of natural gas and other light fuels. Normally when such shortages occur, fuel supply companies reserve the available light fuels for residential customers, and industrial customers such as perlite expansion plants have to curtail operations severely or even shut down entirely for lack of the light fuels. However, if an efficent process for the use of heavier liquid fuels were available, such heavier liquid fuels could be stockpiled during periods of ready availability and then used to supplement or replace entirely the light fuels when the latter were in short supply or entirely unavailable. Similarly, such heavier liquid fuels could be used to supplement or replace the light fuels when economic considerations made it less expensive to do so. Such an improved process would obviously be highly desirable.

BRIEF SUMMARY OF INVENTION

The invention herein comprises an improvement in a perlite expansion process in which perlite granules are expanded by rapid heating in a flame zone in an expansion chamber (preferably vertical) and in which combustion of air and fuel generate the flame zone and the perlite, after expansion, is conveyed out of the chamber by the flow of excess air and combustion by-products. In this invention the improvement comprises: (a) preheating the combustion air by contact with the outer wall of the expansion chamber and absorption of heat emanating therefrom; (b) passing the preheated combustion air to a mixing zone outside the expansion chamber; (c) atomizing heavy liquid fuel and passing the atomized heavy liquid fuel to the mixing zone; (d) mixing the preheated combustion air and the atomized heavy liquid fuel in the mixing zone; (e) vaporizing the atomized heavy liquid fuel by contact with the preheated combustion air; and (f) passing the mixture of vaporized heavy liquid fuel and preheated combustion air to the burner and utilizing the vaporized heavy liquid fuel as at least a portion of the fuel used for combustion in contact with the combustion air. In the preferred embodiment the vaporized heavy liquid fuel serves as the sole combustible fuel for the burner, while in another embodiment the vaporized heavy liquid fuel is mixed with up to an equal volume of light fuel and the mixture serves as the combustible fuel.

The invention herein also comprises an improved perlite expansion apparatus which can utilize vaporized heavy liquid fuel for combustion, wherein perlite granules are expanded by rapid heating in a flame zone in an expansion chamber (preferably vertical), in which air and fuel generate the flame zone and in which the perlite after expansion is conveyed out of the chamber by the flow of residual air and combustion by-products. In such apparatus, in combination with a perlite expansion chamber having an inlet port, an outlet port, means for introducing perlite ore into the expansion chamber, and burner means for establishing a combustion flame zone in which the perlite ore is expanded in the chamber; the improvement thus comprises: (a) means for preheating the combustion air, said means comprising an enclosure surrounding at least a portion of the outer surface of the wall of the expansion chamber, such that air in the enclosure will be in contact with the outer surface of the wall and be preheated by absorption of heat emanating therefrom; (b) mixing means outside of the expansion chamber for mixing atomized liquid fuel and preheated combustion air; (c) means for passing the preheated combustion air from said enclosure to said mixing means; (d) means for atomizing a quantity of liquid fuel; (e) means for passing the atomized liquid fuel from the atomizing means to the mixing means; (f) means wherein the atomized liquid fuel is vaporized by contact with the preheated combustion air; and (g) means to pass the vaporized fuel and preheated combustion air to the burner, wherein the vaporized fuel comprises at least part of the fuel used for combustion in the presence of the combustion air in the burner.

In one embodiment the expansion chamber is a vertical device with the inlet port at the bottom and the outlet port at the top. In another embodiment the apparatus also contains an atomizing nozzle preferably mounted within the regular burner to permit start-up of the unit on liquid fuel. In yet another embodiment the apparatus also contains mixing means wherein light fuel can be mixed with the preheated combustion air to serve as a burner start-up fuel or as a portion of the regular combustion fuel.

BRIEF DESCRIPTION OF DRAWING

The single FIGURE of the drawing is a schematic diagram illustrating a typical embodiment of the process and apparatus of the present invention.

DETAILED DESCRIPTION OF INVENTION

The process and apparatus of this invention will be best understood by reference to the drawing. The central component of the system is perlite expansion chamber 2 which, as shown in its preferred form, is a vertical, generally cylindrical chamber containing an inlet port 4 at the bottom and an outlet port 6 at the top. Disposed in the inlet port 4 is burner 8 wherein combustion fuel is burned in the presence of air to form flame zone 10. Raw perlite ore 12 is fed from hopper 14 by conduit 16 through the wall 18 of expansion chamber 2 to drop by gravity into flame zone 10. Movement of the raw ore from hopper 14 may be assisted if desired by conveying means such as feed screw 20. (Only one representative ore feed unit is shown. Normally there will be two such units, and occasionally more, disposed in convenient positions around the chamber 2.) In flame zone 10 the perlite ore 12 is expanded ("popped") to form the expanded perlite product 22 which is carried upward and out of the expansion chamber through outlet port 6 while entrained in the stream of combustion gases and excess air which passed out of the expansion chamber 2 through conduit 24. Conduit 24 leads to solid/gas separation means (not shown; typically a cyclone or a bag house) in which the expanded perlite 22 is separated from the air and combustion product stream and is conveyed to storage.

The operation as described in the preceeding paragraph is conventional and descriptive of typical prior art perlite expansion processes utilizing vertical expansion chambers. In the aforementioned Jenkins process this conventional prior art operation is improved upon by, in part, enclosing expansion chamber 2 in a concentric cylindrical jacket 30 which is of sufficiently large diameter to create an annular space 32 between the outside of chamber 2 and the inside of jacket 30. Jacket 30 is normally constructed of metal lined with brick 31 or some other moderately insulating material, although if desired it can be constructed as a metal shell with external insulation such as calcium silicate, glass fiber or refractory fiber insulation applied to the outside thereof. The main purpose of jacket 30 is to provide an enclosure (annular space 32) in which combustion air can be preheated by absorbing the heat which emanates from (i.e., which is radiated and/or conducted from) the outside of the wall 18 of expansion chamber 2 during operation of the unit. The insulating characteristics of the jacket 30 are thus to be designed such that the heat emanating from the wall 18 of expansion chamber 2 is largely confined to the annular space 32 where it can be absorbed by the combustion air passing therethrough. By minimizing the amount of heat which passes through jacket 30 the heat recouperative properties of the unit are maximized and the surroundings of the entire unit are kept at essentially ambient temperature.

At the base of jacket 30 are support wall sections 34 and 36. Support walls 34 and 36 entirely surround the base of the unit. The extent of support wall 34 is determined by the location of barrier 38 and baffle 40 while support wall 36 extends from barrier 38 to the base 42 of the unit.

Barrier 38 is an annular flat barrier made, for instance, of sheet metal, which entirely surrounds the lower neck 44 of expansion chamber 2 and extends to the inner surface of the walls 34/36 at the junction 46 thereof. Barrier 38 is tightly sealed against passage of air or gas at point 46 where it abuts the wall surface 34/36. It is also sealed when it abuts neck 44. In one embodiment burner 38 is extended directly to neck 44. In the preferred embodiment shown, however, barrier 38 terminates in bellows 45 which in turn is sealed at point 48 where it abuts neck 44. The inner space 47 of bellows 45 therefore communicates with chamber 50 below but is isolated from chamber 52 above. Thus, air and gas in the chamber 50 below barrier 38 are totally isolated from air within the annular space 32 and chamber 52 which lie above barrier 38. Chamber 50 contains access means (not shown) such as a door through which the burner 8 can be reached or removed for maintenance.

Chamber 52 is formed between barrier 38 and baffle 40. Baffle 40 is an annular plate which is sealed to jacket 30 and support wall 34 at the junction 54 thereof. In the center, however, baffle 40 has an opening 56 adjacent to the junction of neck 44 and base 58 of expansion chamber 2. Opening 56 is large enough to allow full air flow from chamber 52 into annular space 52. However, the size of opening 56 is such that the air flow is somewhat impeded so that air entering chamber 52 from blower 60 through conduit 62 will be caused to swirl around neck 44 (or, in the preferred embodiment, bellows 45) and thereafter around base 58 before passing into the main portion of annular space 32 for preheating. This provides positive cooling of neck 44 and base 58 which essentially eliminates sintering ("clinkering") of perlite in these areas of the expansion chamber. (Air flow is generally shown by the large arrows in the drawing.) Air is drawn into blower 60 through air intake conduit 64. In the preferred embodiment incorporating bellows 45, a controlled amount of air is allowed to enter space 47 from chamber 50 to cool neck 44 and prevent clinkering there.

After the combustion air leaves chamber 52 it passes into annular space 32 through opening 56. The air then passes in a somewhat helical pattern up along the outside surface of wall 18. As the air passes through annular space 32 it absorbs by radiation and conduction the heat which is emanating from the outer surface of wall 18, which is the heat generated by the flame zone 10. The top of annular space 32 is enclosed by the top 66 of jacket 30 and the opening through top 66 for conduit 24 is tightly sealed against leakage. Because of thermal expansion such seal will normally be an expansion joint 68. The preheated air therefore must exit from annular space 32 through opening 70 into conduit 72 which is insulated by insulation 73. The air in conduit 72 is then passed through optional light fuel mixer 74 and conduit 76 to mixing zone 78.

Simultaneously, heavy liquid fuel enters the system from a supply tank (not shown) through line 80, metering valve 82 and line 84 and passes atomizing nozzle 86 where it is atomized by a pressurized jet of air from blower 88 passing through line 90. The atomizer is a conventional unit and many suitable types of atomizers will be found described in the literature. Preferred is a sonic atomizing valve commercially available from the Sonic Development Corporation under the trademark "Sonicore". This type of sonic atomizing nozzle operates at air pressure on the order of about 13 psig (0.9 atm. gauge) and thus can operate quite well when blower 88 is a relatively low capacity blower. Other types of atomizing equipment commonly require higher pressure air jet streams for atomizing and thus require air compressors.

As the air jet and liquid fuel pass through and out of nozzle 86 into mixing zone 78 the fuel rapidly atomizes in area 75. Immediately the atomized fuel contacts the preheated air from conduit 76 and rapidly vaporizes in area 77. (Areas 75 and 77 are shown only generally and will vary in location through zone 78 depending on the type and location of the atomizing device used, the nature of the heavy liquid fuel and the temperature of the preheated air.) The vaporized fuel and preheated air are then conveyed through conduit 92 to burner 8 where the air/fuel mixture is burned to form flame zone 10.

In another embodiment of the present invention light fuel such as propane, natural gas or LPG may be brought into the system through line 94, metering valve 96, and line 98 to mixer 74, where it may be mixed with the stream of preheated air and subsequently with the vaporized liquid fuel such that the combustion fuel burned in burner 8 is a mixture of both fuel gas and vaporized liquid fuel.

In the description herein it is important to note that the term "combustion fuel" is used to describe the combustible material burned in burner 8 to form flame zone 10. In the scope of this invention this will consist entirely of vaporized heavy liquid fuel or of a mixture of vaporized heavy liquid fuel and fuel gas. Systems in which the combustible material burned in burner 8 must consist solely of light fuel are not within the scope of the present invention since such represent the conventional prior art systems and do not involve the preheating of air and vaporizing of heavy liquid fuel which are essential to the present invention. For the purposes of this invention the term "heavy liquid fuel" means those fuels which are usually known as "distillate fuels," including kerosene, #1 fuel oil and/or #2 fuel oil. These require an air stream preheated such that it is at 700° F. (370° C.) or higher in area 77 for sufficient vaporization of the heavy liquid fuel. The term "heavy liquid fuel" does, however, exclude residual oils, such as Bunker C oil, #6 fuel oil and other residual oils, which cannot be vaporized for use in this process.

The particular type of burner 8 utilized in the present invention is not critical. Delayed mixing burners or premix burners may be used with good effect.

The provision for incorporation of light fuel into the system through line 94, valve 96 and line 98 also permits the optional procedure of starting up the unit on fuel gas in the manner of the prior art and then, usually after expansion chamber 2 has reached sufficient temperature to adequately preheat air passing through annular space 32, switching to the process of the present invention, either by feeding in progressively greater amounts of liquid fuel to be atomized and vaporized with the preheated air through mixing valve 78 as described or by momentarily stopping the process entirely and restarting it on the vaporized fuel system. Thereafter as desired the system may be operated for prolonged periods using only the heavy liquid fuel or some of the light fuel may be mixed with it. More preferably, however, the unit can be started up on atomized heavy liquid fuel and maintained on the start-up system until the unit is adequately heated to use the vaporized fuel system. Heavy liquid fuel start-up requires the presence of atomizing nozzle 100 which is conveniently located within main burner 8 and has a separate fuel feed line 102. Nozzle 100 is a conventional atomizing nozzle from which the fuel is fired by continuous pilot 104. Pilot 104 may be a gas or electric pilot; in the case of a gas pilot line 102 is a fuel gas supply line, while in the case of an electric pilot conduit 102 is an electrical supply wire.

In the process of this invention it has been found useful to provide conduit 108 controlled by valve 110 and joined to conduit 72 by conduit 112. This line permits a small mount of preheated air (usually not to exceed 5% by volume of the air in conduit 72) to be fed directly into chamber 50. This small amount of air flushes any fuel gas or vaporized liquid fuel and prevents the build-up of such combustible material in chamber 50.

Normally in the process of this invention the vaporized heavy liquid fuel will always comprise at least 50% by volume of the combustion fuel, and preferably the entire quantity of combustion fuel will comprise the vaporized heavy liquid fuel.

The particular operating parameters of temperature, air flow rate, heavy liquid fuel flow rate, air pressure, ore feed rate and the like will be dependent upon the type of perlite ore being expanded, the size of the expansion chamber, the rate of ore feed, and the various sizes of piping and conduits, blowers, pumps and valves for the particular facility being considered. Control of the various operating parameters can be by any convenient means of conventional control. Typical of many control devices are those found in Perry et al, *Chemical Engineers' Handbook* (5th edn., 1973) in Chapter 22. One control feature of particular note is an oxygen sensor 116 connected to a probe 114 in the exhaust gas stream in conduit 24 and which through conventional feedback control mechanisms (not shown) controls the air-to-fuel ratio to optimize combustion of the burner fuel. Those skilled in the art will be readily able to determine the optimum conditions for operating any given expander in the manner of the present invention.

As a specific example of the invention herein, a commerical perlite expander was operated under various modes of operation as described below to expand New Mexico perlite ore to a density of 4 lb/ft$^3$ (0.06 g/cm$^3$). The various types of operation and average values for the resultant amount of ore processed and the thermal efficiency in terms of fuel usage per pound of perlite ore are recorded in the Table below.

TABLE

| Operation | Ore Feed Rate, lb/hr | Fuel Usage, BTU/lb |
| --- | --- | --- |
| 1. Standard commercial oil fired expander as installed | 2800 | 2600 |
| 2. Unit as in No. 1 but with improved oil burner | 3200 | 2200 |
| 3. Standard commercial gas fired expander as installed | 3200 | 1825 |
| 4. Unit as in No. 3 modified according to Jenkins' process | 4800 | 1500 |
| 5. Unit operated as in this process with manual control | 5200 | 1325 |
| 6. Unit operated as in this process with automatic control | 5200 | 1200 |

It will be immediately apparent from these data that the process of this invention clearly presents a major step forward from the highly inefficient oil burning units of the prior art. By means of the present invention, much larger quantities of perlite ore (often twice as much) can be expanded with a significant saving in thermal efficiency. These data also indicate that the process of this invention allows operation of an oil fired unit in a manner at least as efficient as the most efficient gas fired units, those operated according to the Jenkins process. Taken together, the improvements of this invention allow the operator of a perlite expander to operate at a high level of product yield and with a variety of different types of fuels without losing product output and efficiency. Thus the operator can provide more product at lower cost while yet being able to have sufficient versatility in the process to accommodate any variations and/or curtailments in fuel supply including complete cutoffs of gas fuels.

STATEMENT OF INDUSTRIAL APPLICATION

The process and apparatus described and claimed herein have utility in the industrial expansion of perlite ore, which expansion converts the raw ore to a less dense form which is useful for thermal insulation and/or lightweight aggregate.

I claim:

1. In a process for the expansion of perlite in which perlite granules are expanded by rapid heating in a flame zone in an expansion chamber, said flame zone is created by the combustion of combustible fuel in the presence of air, said combustion is initiated by a burner, and said perlite after expansion is conveyed out of said expansion chamber entrained in the flow stream formed of excess air and combustion products, the improvement whereby said process may be operated on combustible fuel comprising light fuel, heavy liquid fuel or mixtures thereof alternatively, without change in the apparatus by which means the process is practiced, said improvement comprising:
    (a) preheating the air for combustion in an enclosure adjacent to the outer wall of said expansion chamber, said preheating being accomplished by contacting the air with said outer wall of said expansion chamber and absorption by said air of heat emanating from said wall;
    (b) providing a conduit for said preheated air from said enclosure to said burner;
    (c) locating a mixing chamber in said conduit at a point ahead of said burner;
    (d) passing said preheated air to said mixing zone;
    (e) providing to said mixing zone a quantity of combustion fuel sufficient to burn in the presence of said preheated air in said expansion chamber to form said flame zone, the combustion fuel and preheated air being mixed in said mixing zone;
    (f) atomizing the heavy liquid fuel component of said combustion fuel and passing said mixed combustion fuel and air to a vaporization zone;
    (g) vaporizing said atomized heavy liquid fuel component and the liquid fuel component of the light fuel component of said combustion fuel by contact with said preheated air in said vaporization zone; and
    (h) passing the mixture of vaporized combustion fuel and preheated air to said burner and burning said combustion fuel in the presence of said air to form said flame zone.

2. A process as in claim 1 wherein said vaporized heavy liquid fuel serves as all the combustion fuel for said burner.

3. A process as in claim 1 wherein said combustion fuel comprises a mixture of said heavy liquid fuel and up to an equal volume of light fuel.

4. A process as in claims 2 or 3 wherein said heavy liquid fuel is distillate oil, #1 fuel oil or #2 fuel oil.

5. A process as in claim 1 further comprising starting up the process by means of heavy liquid fuel fired by a pilot.

6. Perlite expansion apparatus which can utilize vaporized heavy liquid fuel for combustion, wherein perlite granules are expanded by rapid heating in a flame zone in an expansion chamber in which air and combustible fuel generate the flame zone and in which the perlite after expansion is conveyed out of the chamber by the flow of residual air and combustion by-products, said apparatus comprising, in combination with a perlite expansion chamber having an inlet port, an outlet port, means for introducing perlite ore into the expansion chamber, and burner means for establishing a combustion flame zone in which the perlite ore is expanded in the chamber: (a) means for preheating the combustion air, said means comprising an enclosure surrounding at least a portion of the outer surface of the wall of the expansion chamber, such that air in the enclosure will be in contact with the outer surface of the wall and be preheated by absorption of heat emanating therefrom; (b) mixing means outside of said expansion chamber for mixing atomized heavy liquid fuel and preheated combustion air; (c) means for passing said preheated combustion air from said enclosure to said mixing means; (d) means for atomizing a quantity of heavy liquid fuel; (e) means for passing the atomized heavy liquid fuel from said atomizing means to said mixing means; (f) means wherein the atomized heavy liquid fuel is vaporized by contact with said preheated combustion air; and (g) means to pass the mixture of vaporized heavy liquid fuel and preheated combustion air to said burner, wherein said vaporized heavy liquid fuel comprises at least part of said combustible fuel.

7. Apparatus as in claim 6 wherein said expansion chamber is vertical.

8. Apparatus as in claim 7 wherein said inlet port is at the bottom of said vertical chamber and said outlet port is at the top thereof.

9. Apparatus as in claims 6, 7 or 8 further comprising an atomizing nozzle within said burner to permit start-up utilizing heavy liquid fuel.

10. Apparatus as in claims 6, 7 or 8 further comprising a second mixing means wherein light fuel can be mixed with said combustion air to serve as a portion of said combustible fuel.

11. Apparatus as in claims 6, 7 or 8 wherein said atomizing means comprises a sonic atomizing nozzle.

12. Apparatus as in claims 6, 7 or 8 further comprising means for passing a small amount of said preheated air into an enclosure surrounding said burner to prevent unburned combustible material from accumulating in the vicinity of said burner.

13. Apparatus as in claims 6, 7 or 8 wherein said combustion air is introduced into said apparatus at a point adjacent to said inlet port.

14. Apparatus as in claim 13 further comprising baffle means disposed to direct said combustion air around the lower portions of said expansion chamber.

* * * * *